United States Patent [19]

Kletecka et al.

[11] Patent Number: 5,278,209
[45] Date of Patent: Jan. 11, 1994

[54] THERMOOXIDATIVE STABILIZATION OF POLYOLEFINS WITH AN OXO-PIPERAZINYL-TRIAZINE AND A PHOSPHOROUS ACID ESTER

[76] Inventors: George Kletecka, 20542 Belvedere, Fairview Park, Ohio 44126; John T. Lai, 3465 Ridge Park Blvd., Broadview Heights, Ohio 44147

[21] Appl. No.: 888,950

[22] Filed: May 26, 1992

Related U.S. Application Data

[63] Continuation-in-part of Ser. No. 580,731, Sep. 11, 1990, abandoned.

[51] Int. Cl.⁵ .................... C08K 5/3492; C08K 5/52
[52] U.S. Cl. ..................... 524/100; 524/120; 524/147; 524/149; 524/151
[58] Field of Search .............. 524/100, 120, 147, 149, 524/151

[56] References Cited

U.S. PATENT DOCUMENTS

| | | | |
|---|---|---|---|
| 4,261,880 | 4/1981 | Fujii et al. | 524/120 |
| 4,305,866 | 12/1981 | York et al. | 524/120 |
| 4,480,092 | 10/1984 | Lai et al. | 544/113 |

*Primary Examiner*—Kriellions Morgan
*Attorney, Agent, or Firm*—D. L. Pawl; A. D. Lobo

[57] ABSTRACT

Only two symmetrical stabilizers in a polyolefin or copolymer thereof, provide thermooxidative ("TO") or antioxidative ("AO") stability. One is an arylphosphite or arylfluorophosphite; the other is a monomolecular tri-substituted triazine in which each of three chlorine atoms on a trihalo-s-triazine is substituted with a piperazinone in which the N atom in the 4-position is alkylated. Only a trace amount of phosphite, at least 0.01 phr but less than 0.1 phr, is used so that the ratio of the piperazinone-substituted stabilizer to ester is greater than 1; additional phosphite has no noticeable effect. The trace amount of phosphite has a surprising booster effect, giving the stabilized composition excellent TO stability. Articles thermoformed from the stabilized polyolefin or copolymer thereof may be used under the hood or the dash of a vehicle, and, in containers for packaging goods, all of which articles are subject to TO degradation even if they are not subject to ultraviolet light degradation.

13 Claims, No Drawings

THERMOOXIDATIVE STABILIZATION OF POLYOLEFINS WITH AN OXO-PIPERAZINYL-TRIAZINE AND A PHOSPHOROUS ACID ESTER

BACKGROUND OF THE INVENTION

This is a continuation-in-part application of Ser. No. 580,731 filed Sep. 9, 1990, now abandoned.

This invention relates to the use of a particular hindered amine light stabilizer ("HALS"), namely a monomeric oxopiperazinyl triazine in a novel combination with known aryl esters of phosphorous acid, and of fluorophosphorous acid. Such oxo-piperazinyl triazines are referred to hereinafter as "triazines" for brevity. The aryl esters ("arylphosphites" and "arylfluorophosphites") are well known "synergists" being used as process stabilizers, or melt stabilizers, conventionally used in combination with a hindered phenol AO. Each novel combination has been found to be unexpectedly effective to stabilize a polyolefin against thermal oxidative ("thermooxidative" or "TO", for brevity) degradation, in the substantial absence of a hindered phenol antioxidant, so long as the aryl ester is present in a very low concentration in the range from 0.01 to less than 0.1 phr (parts per 100 parts of polyolefin), which concentration is lower than that at which such an ester is typically used in combination with a hindered phenol in commercial applications.

Though polyolefins are routinely stabilized with a combination of a UV light stabilizer and such aryl esters, no prior art reference suggests that any HALS would be unexpectedly effective with an arylphosphite or arylfluorophosphite, that is, that such an ester might be a "synergist" with the HALS in a manner analogous to the synergistic effect such esters are known to have on polyolefins stabilized with hindered phenols.

The use of a diphosphite in polypropylene, in conjunction with a hindered phenol, is taught in U.S. Pat. No. 4,305,866 to York et al. For specific use with a polyolefin which has been produced in the presence of a Ziegler type complex catalyst supported on a halogen-containing magnesium compound which has not been subjected to a catalyst residue-removal step, U.S. Pat. No. 4,261,880 to Fujii et al teaches the use of a wide variety of phosphite and thiophosphite esters. In addition they specifically identify a host of "Auxiliary Components" (see bottom of col 6) among which they list "Ultraviolet absorbers" (see col 7, line 8), but identify a benzophenone, not a HALS. Though both benzophenone and HALS are ultraviolet absorbers, they are structurally unrelated. Irrespective of the structure of the UV light stabilizer, there is no suggestion that one skilled in the art might expect anything but additive effectiveness.

Specifically because the unexpected effectiveness of the combination of PIP-T or MPIP-T and arylphosphite or arylfluorophosphite is evident without the addition of a hindered phenol antioxidant, and further predicated upon use of the ester in a trace amount, less than 0.1 phr, the prior art missed the effect of phosphites containing an aryloxy group with the O atom directly bonded to a P atom.

In one instance the triazine of the effective combination is a monomeric oxo-piperazinyl triazine with an unsubstituted $N^4$ atom (PIP-T), referred to as an "unblocked PIP-T"; in the other, the triazine is a $N^4$-methylated oxo-piperazinyl triazine (MPIP-T), referred to as a "blocked PIP-T" because the $N^4$ atom of the piperazinone ring is alkylated. The combination of a MPIP-T and ester is found to be more effective than that of a PIP-T and the ester. Further, as seen from evidence of test results on various samples in the illustrative examples containing only 0.03 phr of ester and 0.17 phr of PIP-T or MPIP-T, the blocked and unblocked triazines having piperazinone substituents ("piperazinone triazines") show an unexpected effectiveness not only with respect to the use of these low concentrations of esters, but also with respect to commercially available currently used blocked and unblocked triazines having piperidyl substituents ("piperidyl triazines") in combination with the phosphites.

The effectiveness of piperazinone-triazines as AOs was overlooked because they were characterized as HALS which were used primarily for protection against UV degradation as were other HALS which were piperidyl-triazines, and the latter were well known to have essentially no AO effectiveness. Any general disclosure relating to 1,2,2,6,6-pentamethyl-4-piperidylaminotriazine derivatives being useful as antioxidants, as in UK patent application GB 219423A, was made only because such compounds are known to be good UV-stabilizers. The rationale was that if the mechanism of polymer oxidation, irrespective of how it is propagated, follows the same course, effective UV-stabilizers should be good AOs.

This general concept was enunciated in an article titled "Stabilization of Filled Polyolefins" by E. Stengrevics and P. Horng in *Plastics Compounding*, July/August 1987. They backed up the general notion with data obtained with poly-substituted piperidinyl HALS in combination with specific hindered phenol AOs and less than 0.1 phr of a triarylphosphite. The data showed that polymeric piperidyl-substituted HALS in combination with 0.05% triarylphosphite were more effective than 0.1% of a hindered phenol (see Table I). However, 0.0125% of the triarylphosphite in combination with a non-polymeric piperidyl-substituted compound (identified as HALSI) failed at 70° C. (see Table II). In further tests, the base stabilization system was a combination of a hindered phenol and 0.1% phosphite, and HALSI showed no contribution to thermal stability (see middle of col 1, pg 38).

From the foregoing it is clear that it was deemed essential that the hindered phenol be used with 0.1% of a phosphite for the base system; and, that, if the hindered phenol was left out, a non-polymeric piperidyl-substituted compound would not show any improvement over a hindered phenol AO.

It was thus only by chance that it was found that both, the PIP-T and MPIP-T, have such substantial AO activity as to dispense with the use of a hindered phenol which produced color in a polyolefin. The AO activity of MPIP-T is disclosed in U.S. Pat. No. 5,098,944 to Kletecka et al and the AO activity of PIP-T is disclosed in concurrently filed Ser. No. 580,726 to Kletecka et al. It was these chance discoveries which suggested that the AO activity contributed by the PIP-T and MPIP-T might be enhanced with a commonly available, symmetrical, aryl-containing ester of phosphorous acid or fluorophosphorous acid, each routinely used as an AO. But using such an aryl ester at or above the 0.1 phr level, as one would routinely do, failed to show an unexpectedly large boost in TO stabilization.

By a "symmetrical ester" I refer to one having a structure which is symmetrical about either a P atom, as in a triarylphosphite; or, about a C atom, as in a substituted pentaerythritol diphosphite having oppositely disposed aryl ester substituents.

It was the chance use of a trace amount (less than 0.1 phr) of the aforesaid esters, substantially in the absence of a hindered phenol AO, which exhibited the characteristic of a "synergist", analogous to the esters, activity with a hindered phenol. As evidenced by the illustrative examples provided herein, the esters, present in an amount less than 0.1 phr, provide a far greater boost in TO stabilization than one might expect from their additive contribution.

This effect of the esters as synergists was particularly surprising in view of the fact that the thrust of U.S. Pat. No. 4,187,212 to Zinke et al was that symmetrical triarylphosphites having the structure given herebelow, in combination with hindered phenol AOs were remarkably effective against degradation reactions and crosslinking reactions such as those normally occurring in the processing of olefins. The clear implication was that the presence of the hindered phenol was essential.

Further, tri-esters of phosphorous acid and fluorophosphorous acid are preferably used in combination with other antioxidants, as they are most effective when so used (see "The Stabilisation of Plastics against Light and Heat" by J. Voigt, first ed., pg 323, Springerverlag 1966). Again, in GB 1,078,772 it is disclosed that the mixture of aryl-containing phosphites with o-substituted phenols in polyolefins exhibits particularly good stabilization, the high degree of effectiveness being attributed to the o-substituent in the phenol component.

Though the piperidyl compounds are stated to be effective antioxidants, they are not effective enough (as an antioxidant) in polyolefins, and in particular, homopolymers of propylene, or copolymers of propylene and ethylene in which the latter is present in a minor amount by Weight (such homopolymers and copolymers are collectively referred to herein as "PP" for brevity), to warrant their use, without the use of a secondary stabilizer, for such duty. When piperidinyls are used as stabilizers, they are used as light stabilizers to protect against ultraviolet radiation, and, in practical applications, only in combination with a phosphorous acid ester or fluorophosphorous acid ester, hindered phenol or other antioxidant.

Evidence of the foregoing is provided in an article titled "Hindered Diazacycloalkanones as Ultraviolet Stabilizers and Antioxidants" by J.T. Lai, P.N. Son and E. Jennings, *Polymer Stabilization and Degradation* 91-99, ACS Symposium Series, American Chemical Society, Washington, D.C. (1985). Slit tapes of PP (2×100 mil) containing a combination of 0.1 phr (parts per 100 parts of substrate) of HALS, aged in the Arizona sun, even the polymeric piperidine did not fare very well (pg 92).

Unique among the HALS disclosed in the aforesaid article was a decahydroquinoxaline which provided both AO and light stabilization. It was determined that the most important features for its AO activity were (i) the fused bicyclodiazacycloalkane ring, (ii) dialkyl substituents at the $C^3$ position, and (iii) alkyl, instead of acyl substituents at the $N^1$ position.

We have now provided monomeric triazines which, in combination with less than 0.1 phr of a symmetrical arylphosphite or arylfluorophosphite ester, give outstanding protection against TO degradation when essentially homogeneously distributed in a polyolefin, and simultaneously provide adequate stability during melt processing.

The PIP-T is a monomolecular tri-substituted triazine in which each of three chlorine (or other halogen) atoms on a trihalo-s-triazine, specifically cyanuric chloride, is substituted with an unblocked polysubstituted piperazin-2-one ("PSP") so as to form a tri-substituted triazine with a PSP substituent at each of the 2, 4 and 6 positions on the ring. The MPIP-T has an analogous structure except that the $N^4$ atom of each PSP substituent is alkylated.

The monomolecular PIP-T or MPIP-T is represented by the structure

(I)

wherein PSP represents a substituent derived from a cyclic amine.

In a MPIP-T, each PSP is represented by a structure selected from the group consisting of

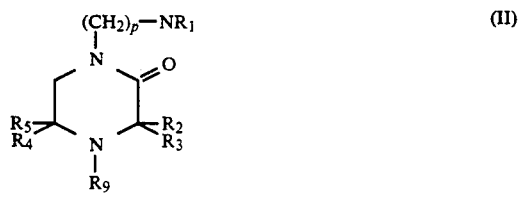

(II)

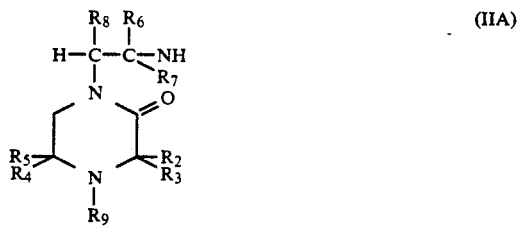

(IIA)

wherein, $R_1$ represents $C_1$–$C_{24}$ alkyl, $C_5$–$C_{20}$ cycloalkyl, $C_7$–$C_{20}$ araalkyl or alkaryl, $C_1$–$C_{24}$ aminoalkyl, or $C_6$–$C_{20}$ aminocycloalkyl;

$R_2$, $R_3$, $R_4$, and $R_5$ independently represent $C_1$–$C_{24}$ alkyl; and, $R_2$ with $R_3$, or $R_4$ with $R_5$ are cyclizable to $C_5$–$C_{12}$ cycloalkyl including the $C^3$ and $C^5$ atoms respectively, of the piperazin-2-one ring;

$R_6$ and $R_7$ independently represent $C_1$–$C_{24}$ alkyl, and polymethylene having from 4 to 7 carbon atoms which are cyclizable;

$R_8$ represents H, $C_1$–$C_6$ alkyl, and phenyl;

$R_9$ represents $C_1$–$C_3$ alkyl; and, p represents an integer in the range from 2 to about 10.

In a PIP-T, each PSP is represented by a structure selected from the group consisting of

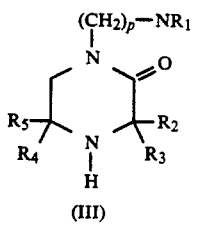

(III)

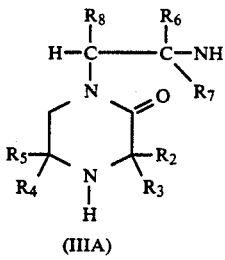

(IIIA)

Specific PIP-Ts which are tri-substituted have the following polysubstituted piperazin-2-one substituents:
1-[3-(isopropylamino)propyl]-3,3,5,5-tetramethylpiperazin-2-one;
1-[2-(isopropylamino)ethyl]-3,3,5,5-tetramethylpiperazin-2-one;
1-[2-(butylamino)ethyl]-3,3,5,5-tetramethylpiperazin-2-one; and,
1-[2-(cycohexylamino)ethyl]-3,3,5,5-tetramethylpiperazin-2-one; inter alia.

Specific MPIP-Ts which are tri-substituted with polysubstituted piperazin-2-one substituents are prepared by alkylating the foregoing PIP-Ts so as to alkylate the N4 atom. Each PSP substituent is attached through the terminal N atom to the triazine ring, the PSP being selected from
1-[3-(isopropylamino)propyl]-3,3,4,5,5-pentamethylpiperazin-2-one;
1-[2-(isopropylamino)ethyl]-3,3,4,5,5-pentamethylpiperazin-2-one;
1-[2-(butylamino)ethyl]-3,3,4,5,5-pentamethylpiperazin-2-one; and,
1-[2-(cycohexylamino)ethyl]-3,3,4,5,5-pentamethylpiperazin-2-one; inter alia.

It is this limited class of triazines, and particularly those monomolecular ones having a relatively low MW in the range from about 850 to less than 2000, which display the remarkable AO stabilization activity in the presence of such a low concentration of phosphorous acid or fluorophosphorous acid ester.

Because of the excellent TO stability of the novel combinations of this invention, the components are not easily volatilized during the manufacture of an article, or during the useful life of the article. Thus, PP articles may be used in the temperature range from about 120° C. to about 145° C. or below the heat distortion temperature (HDT) of the PP. This makes a PIP-T or MPIP-T the stabilizer of choice for impellers for washing machines for clothes, and impellers for dish-washing machines; as an inner liner for automobile fenders; for under the hood applications in automobiles; etc.

Further, a combination of the triazine with so low a concentration of ester is exceptionally compatible with polymers, often behaving as a single phase, for example by being substantially soluble in PP, the solubility being affected by the molecular weight of the polymer. This is particularly noteworthy because polar UV stabilizers are known to be excluded from the crystalline phase of a polyolefin such as PP, preferring to be concentrated in the amorphous phase from which it can more readily migrate to the surface of a mold or die in which an article is being formed.

Moreover, preferred triazines and esters are essentially water-white, or only slightly colored, crystalline or amorphous solids, or non-viscous liquids, so that they are easily homogeneously dispersed in a polymeric substrate and impart no color, or only a negligible amount of color to the substrate in which they are dispersed or dissolved.

SUMMARY OF THE INVENTION

It has been discovered that a trace amount, less than 0.1 phr, of symmetrical aryl esters of phosphorous acid or fluorophosphorous acid, in combination with no more than 0.2 phr of an oxo-piperazinyl triazine with three piperazinone substituents, each of which has an $N^4$ atom which may, or may not be alkylated, provides surprising thermooxidative ("TO") stability in a polyolefin.

It is therefore a general object of this invention to provide a stabilized poly($\alpha$-olefin), or a copolymer of an $\alpha$-olefin, in which copolymer a repeating unit derived from the $\alpha$-olefin is present in a major molar amount, for use in applications where degradation by UV-light may not be a primary concern, or even a significant consideration, such as in thermoformed articles for use under the hood or the dash of a wheeled vehicle, which articles are subject to TO degradation; and, in containers for packaging the goods.

It is a specific object of this invention to provide an article of arbitrary shape, derived from a thermoformed composition of matter consisting essentially of a polyolefin or the aforesaid copolymer containing at least 75 molar % of polymerized $\alpha$-olefin, which article is stabilized against TO degradation by combining from 0.1 phr to 2 phr of a PIP-T or MPIP-T with at least 0.01 phr but less than 0.1 phr of a symmetrical aryl ester of phosphorous acid or fluorophosphorous acid, in the absence of a hindered phenol AO, so as to provide a level of stability which is unexpectedly greater than the additive contribution of each stabilizer.

It has still further been discovered that whether the symmetrical arylphosphite or arylfluorophosphite ester is used in combination with a PIP-T or a MPIP-T, an amount of the ester in excess of 0.1 phr produces essentially no additional boost in stability of the polyolefin in which it is used.

DETAILED DESCRIPTION OF PREFERRED EMBODIMENTS

In the best mode, the invention is directed to a stabilized composition of matter consisting essentially of polypropylene, or polyethylene, and copolymers thereof in which a repeating unit derived from an o-olefin is present in a major molar amount, preferably more than 75 mole %, in combination with a PIP-T or MPIP-T, and at least 0.01 but less than 0.1 phr of a symmetrical aryl ester of phosphorous acid, or fluorophosphorous acid substantially in the absence of a hindered phenol AO. Though homopolymers of ethylene and propylene are most commonly used, homopolymers of isobutylene, 1-butene, 1-pentene, 4-methyl-1-pentene, and 1-hexene may also be stabilized with the PIP-T or MPIP-T and ester, each present in the range specified above. Copolymers of one of these $\alpha$-olefins with a diene monomer are commercially available and may be stabilized in the same manner.

As will be seen from the structure of the triazines set forth hereinabove, the substituents are essentially symmetrically disposed about the triazine ring. It is thought that the symmetrical structure of the esters used herein may be peculiarly effective with the triazines based in large part on this mutual symmetry of structures and that their effect is particularly enhanced because of their aryl aralkyl or alkaryl substituents.

The particular degree of effectiveness of the combination of triazines and ester in PP is evidenced by improved strength and discoloration resistance, and the retention of flexibility of test samples of PP plaques and fibers oven-aged by exposure to heat in a convection oven in accordance with the procedure for heat aging without load, set forth in ASTM D-3045-74. The tensile strengths of plaques were measured according to the procedure set forth in ASTM D-882-83. Failure is determined either by intense discoloration, or brittleness when manually flexed, or when the tensile is reduced by 50% from the original.

A particular MPIP-T has the structure (I) in which PSP is represented by

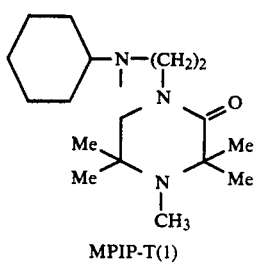

MPIP-T(1)

In a particular monomolecular polysubstituted $N^4$-unsubstituted piperazinone-triazine PIP-T(1) the PSP is represented by the structure

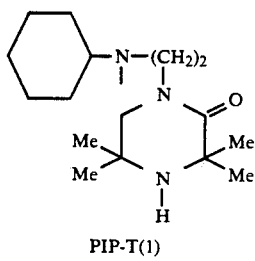

PIP-T(1)

The symmetrical arylphosphites contain at least two aryloxy substituents, each substituent represented by the structure O—R′ wherein O is directly bonded to a P atom, and R′ represents phenyl, or substituted aryl, O—R′ being represented as

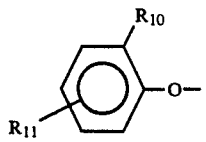

wherein $R_{10}$ is selected from the group consisting of $C_1$–$C_{20}$ alkyl, $C_5$–$C_8$ alkyl, and $C_6$–$C_{20}$ aralkyl, and $R_{11}$ is selected from hydrogen or the same group as $R_{10}$. Typically $R_{10}$ represents tert-butyl, 1,1-dimethylpropyl, cyclohexyl or phenyl.

Particular triaryl phosphites have the structure

P—[O—R′]$_3$

Particular symmetrical pentaerythritol arylphosphites are represented by the structure

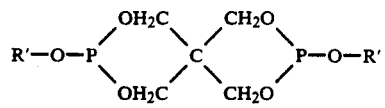

Examples of commonly available symmetrical triaryl esters of phosphorous acid which may be used are triphenyl phosphite; tris(nonylphenyl) phosphite; and tris(2,4-di-t-butylphenyl) phosphite (Mark 2112 or Irgafos 168). Most preferred symmetrical ester of phosphorous acid is tris(2,4-di-t-butylphenyl) pentaerythritol diphosphite (ULTRANOX 626a trademark of Weston division of General Electric Co.).

The symmetrical fluorophosphite has at least one aryloxy group and at least one fluorine atom bonded directly to a trivalent phosphorus atom.

Preferred arylfluorophosphites have a structure selected from

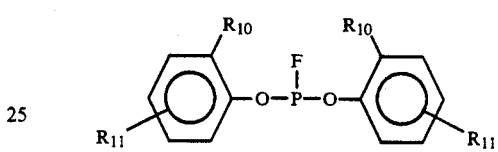

and

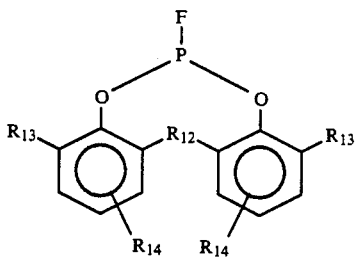

wherein $R_{12}$ is a divalent group selected from —$S_x$— wherein x is an integer from 1 to 3, methylene or $C_2$–$C_{12}$ alkylidene; and, $R_{13}$ is a $C_4$–$C_{20}$ tert-alkyl group, and $R_{14}$ is selected from hydrogen, $C_1$–$C_{20}$ alkyl, $C_5$–$C_8$ cycloalkyl, or $C_7$–$C_{20}$ aralkyl.

Some examples of preferred arylfluorophosphites are 2,2′-methylenebis(6-tert-butylphenyl) fluorophosphite; 2,2′-ethylidenebis(4,6-di-t-butylphenyl) fluorophosphite; 2,2′-ethylidenebis(4,6-di-t-dodecylphenyl) fluorophosphite; 2,2′-isopropylidenebis(6-t-octylphenyl) fluorophosphite; and, 2,2′-thiobis(4,6-di-t-butylphenyl) fluorophosphite. Most preferred is 2,2′-ethylidenebis(4,6-di-t-butylphenyl) fluorophosphite having the structure

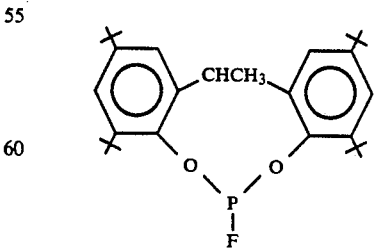

+ = t-butyl

The average results (failure at the end of days) obtained in the standard procedure of oven aging at 125°

C. and 140° C. with each stabilizer identified, using a statistically significant number of polypropylene plaques molded from commercially available Profax 6301 lot #60989, each plaque 5 cm×5 cm×20 mils thick, using a specific triaryl phosphite, namely Ultranox 626, and a specific fluorophosphite, namely ETHANOX 398 a Trademark of Ethyl Corporation, are set forth in Table 1 herebelow.

Each sample contained 0.05 phr of calcium stearate as lubricant, and the specified amount of stabilizer(s). The ingredients for each recipe were mixed by thoroughly shaking in a paper bag. The mixture was then extruded and pelletized. The pellets were used to mold a 8" (inch)×8" plaque which was then cut into squares to be tested in the oven.

manually checked for brittleness. The time is noted when each sample fails. The average of the recorded times when each of the four samples failed is computed from a weighted average of the time of failure of each sample. When one or more of the samples have not failed, the test data is reported as being still in progress and the actual number of calendar days is stated.

The results are set forth below, first listing samples with only a single stabilizer added. Combinations are provided at different levels of esters to demonstrate that the most notable and unexpected boost of the ester is obtained at ester levels lower than 0.1 phr, and a ratio of PIP-T or MPIP-T to ester which is greater than 1. Any excess ester, if added, is added to no especially significant effect.

TABLE 1

| Indentif. of stabil. | Level of stabil. | 125° C. (days) | Arith. add'n. @ 125° C. | 140° C. (days) | Arith. add'n @ 140° C. |
|---|---|---|---|---|---|
| Blank PP | 0 | 11 | | 2 | |
| MPIP-T (1) | 0.1 | 379 | | 73 | |
| CHIMASSORB 944 | 0.1 | 89 | | 24 | |
| Ultranox 626 | 0.1 | 32 | | 8 | |
| Ethanox 398 | 0.1 | 25 | | 6 | |
| PIP-T (1) a trademark of Ciba-Geigy Corporation | 0.1 | 342 | | 43 | |
| PIP-T (1) Ultranox 626 | 0.1 0.1 | 388 | 374 | 82 | 51 60% |
| MPIP-T (1) Ultranox 626 | 0.1 0.1 | 391 | 411 | 99 | 81 22% |
| Chimassorb 944 Ultranox 626 | 0.1 0.1 | 92 | 121 | 27 | 32 |
| PIP-T (1) Ethanox 398 | 0.1 0.1 | 443 | 367 | 44 | 49 |
| MPIP-T (1) Ethanox 398 | 0.1 0.1 | 430 | 404 | 74 | 79 |
| Chimassorb 944 Ethanox 398 | 0.1 0.1 | 89 | 114 | 30 | 30 |
| MPIP-T (1) | 0.2 | >658* | | 94 | |
| Chimassorb 944 | 0.2 | 150 | | 37 | |
| Ultranox 626 | 0.2 | 48 | | 10 | |
| Ethanox 398 | 0.2 | 32 | | 8 | |
| PIP-T (1) | 0.2 | >658* | | 80 | |
| PIP-T (1) | 0.17 | >658* | | 80 | |
| MPIP-T (1) | 0.17 | >658* | | 80 | |
| Chimassorb 944 | 0.17 | 134 | 31 | | |
| Ultranox 626 | 0.03 | 12 | | 2 | |
| Ethanox 398 | 0.03 | 12 | | 2 | |
| PIP-T (1) Ultranox 626 | 0.17 0.03 | >658* | >658* | 82 | 70 17% |
| PIP-T (1) Ethanox 398 | 0.17 0.03 | >658* | >658* | 94 | 82 14% |
| MPIP-T (1) Ethanox 398 | 0.17 0.03 | >658* | >658* | 116 | 82 41% |
| MPIP-T (1) Ultranox 626 | 0.17 0.03 | >658* | >658* | 124 | 82 |
| Chimassorb 944 Ethanox 398 | 0.17 0.03 | 141 | 146 | 38 | 33 |
| Chimassorb 944 Ultranox 626 | 0.17 0.03 | 149 | 146 | 34 | 33 |

*the samples had not failed when the tests were discontinued in March 1992.

Though the generally accepted test temperature for polypropylene plaques is 125° C., a higher temperature (140° C.) was also used because degradation is too slow at the lower temperature. As will be evident, some samples had still not failed nearly 2 years after the tests were begun. The oven aging tests are carried out in a convection oven in the absence of ultraviolet or visible light.

Four sets of samples are randomly positioned in the oven. The samples are visually inspected for signs of failure, the frequency of inspection depending upon the temperature at which the test is being carried out. As each sample begins to show significant degradation it is Referring to the combinations of PIP-T and MPIP-T with Ultranox and Ethanox each at 0.1 phr, the ratio in each case being 1, the data at 125° C. indicates the arithmetic addition is about the same as the actual failure of the combination, showing no unexpected boost.

The data at 140° C. show a negative effect with 0.1 phr Ethanox 398 and either PIP-T or MPIP-T (lines 6–9, pg 15). But the data at 125° C. show a boost for the PIP-T, and a much smaller boost for the MPIP-T. This is because at the lower temperature the effect of the PIP-T or MPIP-T overrides the negative effect of the ester.

Note, because of the structural differences between the arylfluorophosphite and the arylphosphite, that the data with 0.1 phr Ultranox 626 and plp-T, at 140° C. show a large boost, but a much smaller boost for MPIP-T with the 626. But the data at 125° C. show no significant effect, either positive or negative. As before, this is because at the lower temperature the effect of the PIP-T or MPIP-T overrides the effect of the ester.

Referring to the combinations of PIP-T and MPIP-T each at 0.17 phr with Ultranox and Ethanox each at 0.03 phr, the ratio of PIPT or MPIP-T to ester being 5.7, data at 140° C. indicates the arithmetic addition is substantially less than the actual failure of the combination, showing an unexpected boost. The samples with 0.17 phr of PIPT and MPIP-T at 125° C., with or without the piperazinone stabilizer, had not failed when the tests were discontinued.

Referring to the combinations of Chimassorb 944 and Tinuvin 119 in any combination with Ultranox and Ethanox, there is essentially no substantial boost.

From the foregoing increase in days to failure of the samples, it is evident that there is an unexpectedly high boost in TO stability attributable to the presence of the trace amount of arylphosphite or arylfluorophosphite provided that the ratio of PIP-T or MPIP-T to ester is greater than 1, and that there is always at least 0.01 phr of ester present.

Having thus provided a general discussion of the problems addressed and solved in our invention, and a specific illustration of the best mode for preparing a stabilized composition of matter, and an article thermoformed from such matter, it is to be understood that no undue restrictions are to be imposed by reason thereof, except as provided by the following claims.

We claim:

1. A composition of matter having thermooxidative ("TO") or antioxidative ("AO") stability in the substantial absence of a hindered phenol antioxidant, said composition of matter consisting essentially of a poly($\alpha$-olefin), or a copolymer of an $\alpha$-olefin, in which copolymer a repeating unit derived from said $\alpha$-olefin is present in a major molar amount, and a trace amount, at least 0.01 but less than 0.1 phr, of a symmetrical arylphosphite or an arylfluorophosphite, in combination with from about 0.1 phr to about 2 phr of a tri-substituted triazine derivative ("MPIP-T") in which the 2-, 4- and 6-positions of the triazine ring are substituted with a polysubstituted piperazin-2-one in which the $N^4$ atom is alkylated, said MPIP-T being represented by the structure

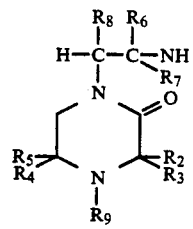

wherein PSP represents a substituent derived from a cyclic amine, said PSP being represented by a structure selected from the group consisting of

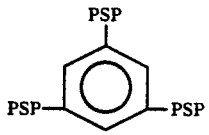

-continued

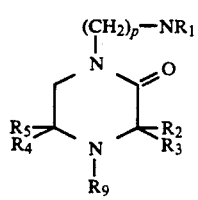

wherein, $R_1$ represents $C_1$-$C_{24}$ alkyl, $C_5$-$C_{12}$ cycloalkyl, $C_7$-$C_{20}$ araalkyl or alkaryl, $C_1$-$C_{24}$ aminoalkyl, or $C_6$-$C_{20}$ aminocycloalkyl;

$R_2$, $R_3$, $R_4$, and $R_5$ independently represent $C_1$-$C_{24}$ alkyl; and, $R_2$ with $R_3$, or $R_4$ with $R_5$ are cyclizable to $C_5$-$C_{12}$ cycloalkyl including the $C^3$ and $C^5$ atoms respectively, of the piperazin-2-one ring;

$R_6$ and $R_7$ independently represent $C_1$-$C_{24}$ alkyl, and polymethylene having from 4 to 7 carbon atoms which are cyclizable;

$R_8$ represents H, $C_1$-$C_6$ alkyl, and phenyl;

$R_9$ represents $C_1$-$C_3$ alkyl; and, p represents an integer in the range from 2 to about 10;

wherein said arylphosphite contains at least two aryloxy substituents, each substituent represented by the structure O—R' wherein O is directly bonded to a P atom, and R' represents phenyl, or substituted aryl represented as

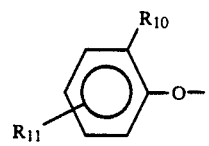

wherein $R_{10}$ is selected from the group consisting of $C_1$-$C_{20}$ alkyl, $C_5$-$C_8$ alkyl, and $C_6$-$C_{20}$ aralkyl, and $R_{11}$ is selected from hydrogen or the same group as $R_{10}$; and, said arylfluorophosphite has at least two aryloxy groups selected from R' and

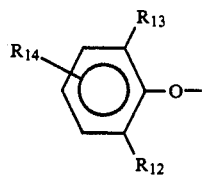

wherein $R_{12}$ is a divalent group selected from —$S_x$— wherein x is an integer from 1 to 3, methylene or $C_2$-$C_{12}$ alkylidene; and, $R_{13}$ is a $C_4$-$C_{20}$ tert-alkyl group, and $R_{14}$ is selected from hydrogen, $C_1$-$C_{20}$ alkyl, $C_5$-$C_8$ cycloalkyl, or $C_7$-$C_{20}$ aralkyl.

2. The composition of claim 1 wherein said symmetrical arylphosphite is selected from the group consisting of (i) a triaryl phosphite ester having the structure

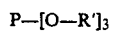

(ii) a pentaerythritol phosphite represented by the structure the symmetrical pentaerythritol arylphosphites are represented by the structure

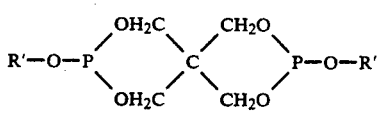

and, (iii) an arylfluorophosphites having a structure selected from the group consisting of

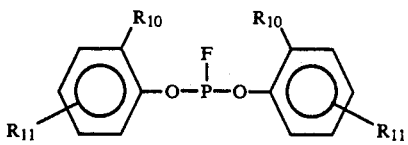

and

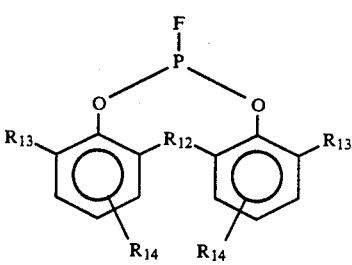

wherein $R_{12}$ is a divalent group selected from $-S_x-$ wherein x is an integer from 1 to 3, methylene or $C_2-C_{12}$ alkylidene; and, $R_{13}$ is a $C_4-C_{20}$ tert-alkyl group, and $R_{14}$ is selected from hydrogen, $C_1-C_{20}$ alkyl, $C_5-C_8$ cycloalkyl, or $C_7-C_{20}$ aralkyl.

3. The composition of claim 2 wherein said symmetrical arylphosphite is selected from the group consisting of triphenyl phosphite; tris(nonylphenyl) phosphite; tris(2,4-di-t-butylphenyl) pentaerythritol diphosphite; tris(2,4-di-t-butylphenyl) phosphite; and said arylfluorophosphite is 2,2'-ethylidenebis(4,6-di-t-butylphenyl)-fluorophosphite.

4. The composition of claim 1 wherein said poly(α-olefin) is a homopolymer of ethylene, propylene, isobutylene, 1-butene, 1-pentene, 4-methyl-1-pentene, or 1-hexene; and, said copolymers are copolymers of said α-olefin with a diene monomer.

5. The composition of claim 2 wherein said polysubstituted piperazin-2-one substituent is selected from the group consisting of:
1-[3-(isopropylamino)propyl]-3,3,4,5,5-pentamethylpiperazin-2-one;
1-[2-(isopropylamino)ethyl]-3,3,4,5,5-pentamethylpiperazin-2-one;
1-[2-(butylamino)ethyl]-3,3,4,5,5-pentamethylpiperazin-2-one; and,
1-[2-(cycohexylamino)ethyl]-3,3,4,5,5-pentamethylpiperazin-2-one.

6. A composition of matter having thermooxidative ("TO") or antioxidative ("AO") stability in the substantial absence of a hindered phenol antioxidant, said composition of matter consisting essentially of a poly(α-olefin), or a copolymer of an α-olefin, in which copolymer a repeating unit derived from said α-olefin is present in a major molar amount, and a trace amount, at least 0.01 but less than 0.1 phr, of a symmetrical arylphosphite or arylfluorophosphite in combination with from about 0.1 phr to about 2 phr of a tri-substituted triazine derivative ("PIP-T") in which the 2-, 4- and 6-positions of the triazine ring are substituted with a polysubstituted piperazin-2-one, said PIP-T being represented by the structure

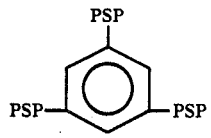

wherein PSP represents a substituent derived from a cyclic amine, said PSP being represented by a structure selected from the group consisting of

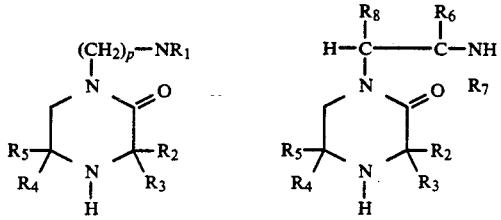

wherein, $R_1$ represents $C_1-C_{24}$ alkyl, $C_5-C_{12}$ cycloalkyl, $C_7-C_{20}$ araalkyl or alkaryl, $C_1-C_{24}$ aminoalkyl, or $C_6-C_{20}$ aminocycloalkyl;

$R_2$, $R_3$, $R_4$, and $R_5$ independently represent $C_1-C_{24}$ alkyl; and, $R_2$ with $R_3$, or $R_4$ with $R_5$ are cyclizable to $C_5-C_{12}$ cycloalkyl including the $C^3$ and $C^5$ atoms respectively, of the piperazin-2-one ring;

$R_6$ and $R_7$ independently represent $C_1-C_{24}$ alkyl, and polymethylene having from 4 to 7 carbon atoms which are cyclizable;

$R_8$ represents H, $C_1-C_6$ alkyl, and phenyl; and, wherein said arylphosphite contains at least two aryloxy substituents, each substituent represented by the structure O—R' wherein O is directly bonded to a P atom, and R' represents phenyl, or substituted aryl represented as

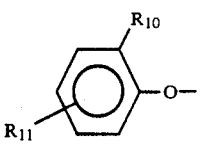

wherein $R_{10}$ is selected from the group consisting of $C_1-C_{20}$ alkyl, and $C_5-C_8$ alkyl, and $C_6-C_{20}$ aralkyl, and $R_{11}$ is selected from hydrogen or the same group as $R_{10}$; and, said arylfluorophosphite has at least two aryloxy groups selected from R' and

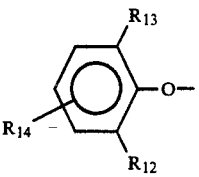

wherein $R_{12}$ is a divalent group selected from $-S_x-$ wherein x is an integer from 1 to 3, methylene or $C_2-C_{12}$ alkylidene; and, $R_{13}$ is a $C_4-C_{20}$ tert-alkyl group, and $R_{14}$ is selected from hydrogen, $C_1$-$C_{20}$ alkyl, $C_5$-$C_8$ cycloalkyl, or $C_7$-$C_{20}$ aralkyl.

7. The composition of claim 6 wherein said symmetrical arylphosphite is selected from the group consisting of (i) a triaryl phosphite ester having the structure

(ii) a pentaerythritol phosphite represented by the structure the symmetrical pentaerythritol arylphosphites are represented by the structure

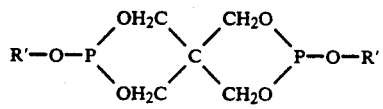

and, (iii) an arylfluorophosphites having a structure selected from the group consisting of

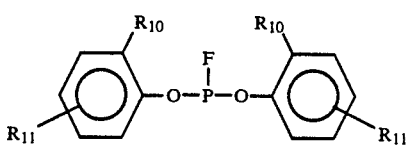

and

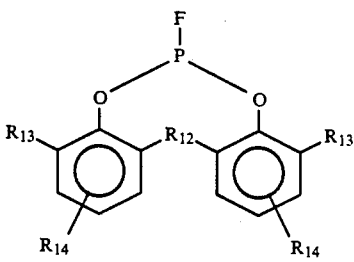

wherein $R_{12}$ is a divalent group selected from $-S_x-$ wherein x is an integer from 1 to 3, methylene or $C_2$-$C_{12}$ alkylidene; and, $R_{13}$ is a $C_4$-$C_{20}$ tert-alkyl group, and $R_{14}$ is selected from hydrogen, $C_1$-$C_{20}$ alkyl, $C_5$-$C_8$ cycloalkyl, or $C_7$-$C_{20}$ aralkyl.

8. The composition of claim 7 wherein said symmetrical arylphosphite is selected from the group consisting of triphenyl phosphite; tris(nonylphenyl) phosphite; tris(2,4-di-t-butylphenyl) pentaerythritol diphosphite; tris(2,4-di-t-butylphenyl) phosphite; and said arylfluorophosphite is 2,2'-ethylidenebis(4,6-di-t-butylphenyl)-fluorophosphite.

9. The composition of claim 6 wherein said poly(α-olefin) is a homopolymer of ethylene, propylene, isobutylene, 1-butene, 1-pentene, 4-methyl-1-pentene, or 1-hexene; and, said copolymers are copolymers of said α-olefin with a diene monomer.

10. The composition of claim 7 wherein said polysubstituted piperazin-2-one substituent is selected from the group consisting of:

1-[3-(isopropylamino)propyl]-3,3,5,5-tetramethylpiperazin-2-one;

1-[2-(isopropylamino)ethyl]-3,3,5,5-tetramethylpiperazin-2-one;

1-[2-(butylamino)ethyl]-3,3,5,5-tetramethylpiperazine-2-one; and,

1-[2-(cycohexylamino)ethyl]-3,3,5,5-tetramethylpiperazin-2-one.

11. A thermoformed article of arbitrary shape, formed from a hompolymer of an α-olefin, or a copolymer of an α-olefin in which copolymer a repeating unit derived from said α-olefin is present in a major molar amount, including a combination of only symmetrical stabilizers which improves the thermooxidative ("TO") or antioxidative ("AO") stability of said article, one stabilizer being an ester present in an amount at least 0.01 phr but less than 0.1 phr, said ester being an arylphosphite or arylfluorophosphite, and without any added secondary stabilizer, and another stabilizer being a monomolecular oxo-piperazinyl triazine having three piperazinone substituents ("PIP-T"), present in an amount such that the ratio of said PIP-T to said ester is greater than 1, said PIP-T having the structure

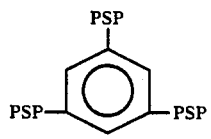

wherein PSP represents a substituent derived from a cyclic amine represented by a structure selected from the group consisting of

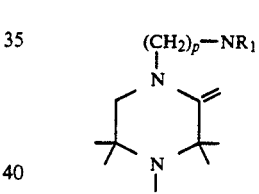  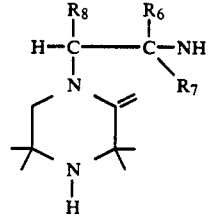

wherein, $R_1$ represents $C_1$-$C_{24}$ alkyl, $C_5$-$C_{12}$ cycloalkyl, $C_7$-$C_{20}$ araalkyl or alkaryl, $C_1$-$C_{24}$ aminoalkyl, or $C_6$-$C_{20}$ aminocycloalkyl; $R_2$, $R_3$, $R_4$, and $R_5$ independently represent $C_1$-$C_{24}$ alkyl; and $R_2$ with $R_3$, or $R_4$ with $R_5$ are cyclizable to $C_5$-$C_{12}$ cycloalkyl including the $C^3$ and $C^5$ atoms respectively, of the piperazin-2-one ring;

$R^6$ and $R^7$ independently represent $C_1$-$C_{24}$ alkyl, and polymethylene having from 4 to 7 carbon atom which are cyclizable;

$R^8$ represents $C_1$-$C_3$ alkyl; and, p represents an integer in the range from 2 to about 10.

12. The article of claim 11 wherein said symmetrical arylphosphite is selected from the group consisting of triphenyl phosphite; tris(nonylphenyl) phosphite; tris(2,4-di-t-butylphenyl) pentaerythritol diphosphite; tris(2,4-di-t-butylphenyl) phosphite; and said arylfluorophosphite is 2,2'-ethylidenebis(4,6-di-t-butylphenyl)-fluorophosphite.

13. The article of claim 12 wherein the ratio of said PIP-T to said symmetrical arylphosphite or arylfluorophosphite is about 5.7.

* * * * *